United States Patent [19]

Vincent

[11] Patent Number: 4,751,451
[45] Date of Patent: Jun. 14, 1988

[54] FAN MOTOR CONTROL SYSTEM

[75] Inventor: David Vincent, Burgess Hill, United Kingdom

[73] Assignee: Vent-Axia Limited, West Sussex, United Kingdom

[21] Appl. No.: 783,431

[22] Filed: Oct. 3, 1985

[30] Foreign Application Priority Data

Oct. 4, 1984 [GB] United Kingdom ................ 8425118

[51] Int. Cl.$^4$ .............................................. H02P 3/18
[52] U.S. Cl. ..................................... 318/814; 318/817
[58] Field of Search ............... 318/729, 749, 750, 751, 318/752, 816, 817, 814; 361/328–330, 31, 96, 97; 310/68 R, 68 B

[56] References Cited

U.S. PATENT DOCUMENTS

| | | | |
|---|---|---|---|
| 2,847,629 | 8/1958 | Schaefer | 318/751 |
| 3,440,491 | 4/1969 | Tenenbaum et al. | 361/94 X |
| 3,988,709 | 10/1976 | McKinnon et al. | 361/24 X |
| 3,996,499 | 12/1976 | Gary et al. | 361/29 X |
| 4,215,303 | 7/1980 | Brimer | 318/752 |
| 4,446,416 | 5/1984 | Wanlass | 318/817 X |
| 4,555,654 | 11/1965 | Spradling et al. | 318/817 X |

FOREIGN PATENT DOCUMENTS 2105931  3/1983  United Kingdom .

OTHER PUBLICATIONS

Japanese Abstract for Condenser Motor 58-79496, May 13, 1983.
Japanese Abstract for Capacitor Motor, 58-29393, Feb. 21, 1983.

*Primary Examiner*—Patrick R. Salce
*Assistant Examiner*—Marc S. Hoff
*Attorney, Agent, or Firm*—Darby & Darby

[57]  ABSTRACT

This invention relates to motor speed control circuits employing capacitors. Two windings of a motor are connected in parallel to a neutral phase of an alternating current source. Each coil of the motor may be connected to the live phase of the source whereby the rotation direction of the motor may be altered. Three socket terminals are connected to each winding. A capacitor pack has three pins with two capacitors connected between a common pin and the two remaining pins. The pins of the capacitor pack can be inserted into the sockets in three different ways whereby either capacitor or the two capacitors in parallel can be connected across the windings to vary thereby the speed and performance characteristics of the motor.

6 Claims, 1 Drawing Sheet

FAN MOTOR CONTROL SYSTEM

BACKGROUND OF THE INVENTION

This invention relates to fan motor control systems employing capacitors and particularly relates to such a circuit for controlling the speed of the fan motor.

Capacitor start-and-run and permanent capacitor motors are well known and the latter type are often used in appliances such as fans where it is a requirement to reverse the direction of rotation of the fan. This invention relates particularly to this type of motor.

Heretofore, speed control of permanent capacitor motors has been effected by means such as voltage varying devices e.g. transformers, resistive or electronic systems.

SUMMARY OF THE INVENTION

According to the present invention there is provided a permanent capacitor motor control circuit comprising output means for connection to a winding of the motor;
a plurality of capacitors;
and selection means operable to selectively connect different combinations of said capacitors to said output means whereby the capacitance presented to said winding varies the speed and performance characteristics of the motor. Thus a choice of fixed speeds can be obtained which may also at a later time be easily changed.

In an embodiment of the invention the selection means comprises a reciprocal plug and socket arrangement for connecting said plurality of capacitors to the output means, said arrangement having different plug locations in the socket to provide thereby said selection of different capacitances. Preferably the capacitors are located in the plug portion to provide a capacitor pack.

The capacitor pack is either plugged into the socket portion at different positions in the socket assembly or, after having been plugged into the socket portion, is selectively switched therein such as to connect any required combination of capacitors across the motor windings in series or in parallel to effect a change in the motor speed and performance characteristics. Such a facility provides a choice of fixed motor speeds when installing the motor and allows the motor performance to be easily changed as required.

BRIEF DESCRIPTION OF THE DRAWINGS

The invention will now be described, by way of example only, with particular reference to the accompanying drawings wherein.

DETAILED DESCRIPTION OF THE PREFERRED EMBODIMENTS

Figure 1A:
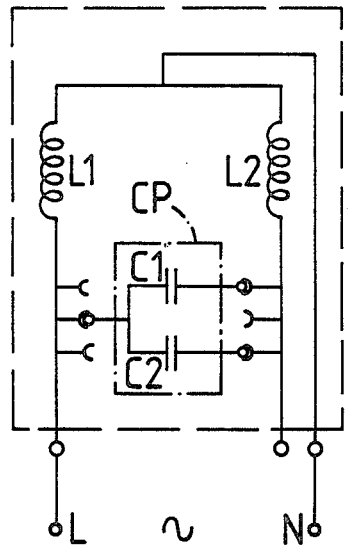
FIGS. 1, 1B and 1C illustrate schematically how movement of the capacitor pack in relation to the socket assembly can selectively connect different combinations of capacitors across the windings of the motor.
Figure 1B:
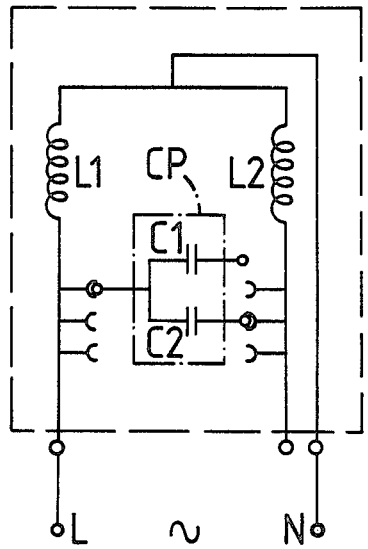
Figure 1C:
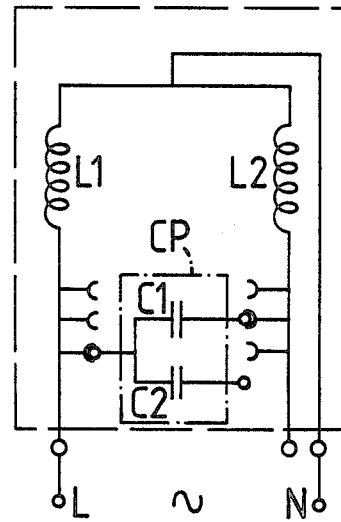
Figure 2:
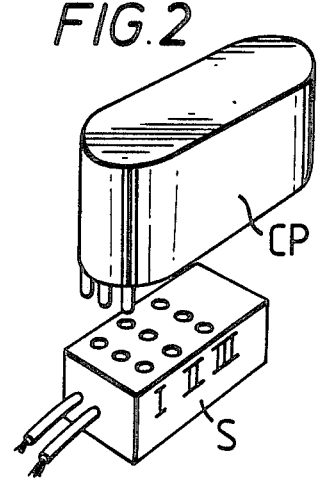
FIG. 2 is a perspective view of the capacitor pack and socket assembly.

As shown in FIGS. 1A, 1B, 1C, the windings L1,L2 of the motor are connected to an AC supply source for forward or reverse rotation of the rotor of the motor. Two capacitors C1,C2 are connected across the windings via the plug and socket connections of FIG. 2. In FIG. 1A, capacitors C1 and C2 are connected in parallel, in FIG. 1B only capacitor C2 is connected across the windings of the motor and in FIG. 1C only capacitor C1 is connected across the windings, the particular capacitor or capacitors selected being determined by the orientation of the three pins of the capacitor pack CP housing the capacitors with respect to the nine holes of the socket assembly S which, as shown, is connected to the motor windings. In FIG. 2, the insertion of the pins in the first row of the socket holes will connect capacitors C1 and C2 across the windings (FIG. 1A), the insertion of the pins in the second row of socket holes will connect capacitor C2 across the windings, and the insertion of the pins into the third row of socket holes will connect capacitor C1 across the windings, thereby achieving three different fixed speeds for the motor.

It will be appreciated that the invention is susceptible to considerable modification and is not to be deemed limited to the particular circuit arrangements described and illustrated, and any number of capacitors may be used to provide a multiplicity of fixed motor speeds.

What we claim is:

1. A permanent capacitor motor control unit comprising:
output means for connecting to a winding of the motor;
a plurality of capacitors located in a capacitor pack;
and selection means comprising a reciprocal plug and socket arrangement for connecting one or more of said plurality of capacitors to the output means, said arrangement having different plug locations in the socket to selectively connect individual capacitors or at least one group of capacitors of said capacitor pack to the output means to vary thereby the speed and performance characteristics of the motor.

2. A control circuit as claimed in claim 1 wherein said plurality of capacitors are disposed in the plug portion of said arrangement to provide a capacitor pack.

3. A control circuit as claimed in claim 1 wherein said plurality of capacitors have the same value.

4. A control circuit as claimed in claim 1 wherein said selection means is located within or on the motor casing or within or on an appliance casing in which the motor is installed.

5. In a permanent capacitor motor control circuit having a motor winding including a first and second output terminal, an arrangement for selecting a value of capacitance to assure appropriate functioning of said motor under conditions where line voltage and frequency may vary, comprising:
a first plurality of electrical sockets connected to said first terminal;
a second plurality of electrical sockets connected to said second terminal;
a capacitor pack having a plurality of capacitors being connected to a fixed arrangement of plug elements;
said electrical sockets being arranged in an ordered series of socket groups such that a different value of capacitance is connected to said winding in each group of said series by selection of one or more capacitors of said pack in order to vary the speed and performance of the motor, said selection occurring upon insertion of said fixed arrangement of plug elements into a respective different group of said series.

6. The arrangement of claim 5, wherein each of said capacitors in said capacitor pack have a pair of terminals, one terminal of each capacitor being connected together in said capacitor pack.

* * * * *